United States Patent Office 3,566,710
Patented Mar. 2, 1971

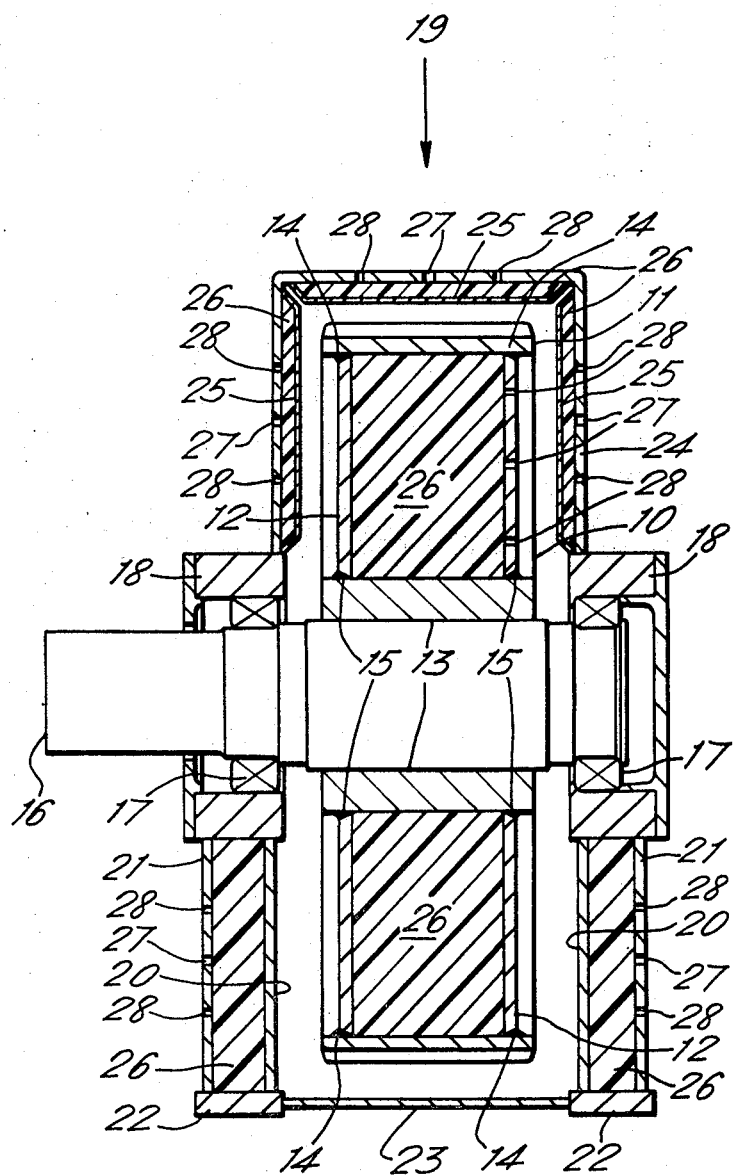

3,566,710
FABRICATED STRUCTURES
Richard A. K. Long, Huddersfield, England, assignor to David Brown Gear Industries Limited
Filed Apr. 1, 1969, Ser. No. 811,786
Claims priority, application Great Britain, Apr. 16, 1968, 17,925/68
Int. Cl. F16f *15/10;* F16h *55/14*
U.S. Cl. 74—443
4 Claims

ABSTRACT OF THE DISCLOSURE

A load-bearing hollow fabricated structure, for example a hollow gear wheel or a cavity-walled gear case, having its interior filled with a rigid plastics material having damping properties. The damping material is bonded to the structure at a myriad of points and carries part of the load applied to the structure as well as reducing noise and vibration.

BACKGROUND OF THE INVENTION

The invention relates to load-bearing hollow fabricated structures, and particularly but not exclusively to toothed gears and cases for toothed gearing.

The operation of gears in mesh releases at the meshing zone successive pulses of energy which are detectable externally to the gear casing as a combination of structure-borne vibration and air-borne noise. The frequency and intensity of the vibration and noise vary with the mechanical and geometrical details of the gear drive and may be objectionable or even dangerous to human hearing and may also excite resonant vibrations in component parts of the gear drive including its casing, mounting and bed-plate and in adjacent machinery. Considerable attention is therefore paid by gear manufacturers to reducing noise generation by well-known methods, particularly the modification of tooth geometry and the production of highly accurate gears of high quality surface finish.

The measures taken hitherto are not entirely successful in that noise is still generated and any further reduction that can be obtained is desirable. It is well known that a gear wheel, being in general a mechanically stiff and undamped structure can resonate at a number of natural frequencies depending on the mode of its vibration and that a periodic exciting force applied to it will cause it to vibrate at an amplitude depending upon the proximity of the exciting frequency to one of the resonant frequencies of the structure. The gear wheel may be of hollow fabricated construction, comprising a rim connected to a hub by side plates. The cavity so produced may act as a resonant chamber, having the effect of amplifying an excitation at or near resonant frequency.

SUMMARY OF THE INVENTION

The object of the present invention is to reduce the generation of noise and vibration in the operation of hollow fabricated structures as parts of or forming supports for dynamically excited systems, and also to reduce the quantity of metal plate required in the fabrication of such structures.

According to the invention, a load-bearing hollow fabricated structure is filled with rigid damping material bonded to said structure at a number of points.

DESCRIPTION OF THE INVENTION

A preferred embodiment of the invention will now be described, by way of example only, with reference to the accompanying drawing which is a sectional side elevation of a gear case with a gear wheel mounted therein.

Referring now to the drawing, a gear wheel 10 is fabricated from a toothed steel rim 11, two steel side plates 12 and a steel hub 13. The side plates 12 are attached to the rim 11 by means of continuous welds 14 and to the hub 13 by means of continuous welds 15. The side plates 12 are of thin section compared with normal construction, and the usual circumferentially-spaced radial stiffening webs bridging the space between the two side plates 12 are omitted. Thus the side plates 12 are plain annular discs without the apertures which are generally provided to give access to the interior of the gear wheel in order to complete the welding in position of said webs. The gear wheel 10 is mounted on a shaft 16 which is rotatably mounted in bearings 17. Each bearing 17 is located in a housing 18 forming part of a gear case indicated generally at 19. The lower portion of the gear case 19 is formed by an inner load-carrying wall 20 and an outer load-carrying wall 21, each wall being secured to a base plate 22 and both walls 20 and 21 being of thin section compared with normal construction. An aperture in the base plate 22 is filled by a plate 23. The upper portion of the gear case 19 is formed by a single outer wall 24 having three thin section plates 25 secured to it.

The annular cavity bounded by the rim 11, hub 13 and side plates 12; the cavity bounded by the wall 20, the wall 21, the housings 18 and the base plate 22; and the cavities bounded by the wall 24 and the plates 25 are filled with a plastics material 26. Said material is of the self-foaming type which bonds firmly to the internal surfaces of the cavities and which cures and hardens to form a rigid cellular structure of relatively high tensile and compressive strength.

The liquid which generates the foamed material 26 is admitted by means of a nozzle through apertures 27 in one of the side plates 12, the wall 21 and the wall 24. An adequate number of small drilled holes 28 are provided in the same side plate 12, each wall 21 and the wall 24 to allow the escape of air from the cavities during production of the foam in situ within said cavities.

A suitable material for production of the rigid foam is a polyether resin to which is added a mixture of a diisocyanato-diphenylmethane composition with trichlorofluoromethane as the foaming agent. The general name for such a material in its final form is rigid urethane foam.

The composite annular sub-structure formed by the two thin side plates 12 and the rigid foam core 26 bonded thereto is designed to have a strength in the necessary direction equivalent to that of the thick side plates and radial stiffening webs formerly used. Thus the quantity of steel plate used in the construction of the gear wheel 10 is substantially less than hitherto, and the depth of the welds required is substantially reduced. Furthermore, the foam filling 26 is known to inhibit corrosion of the surfaces to which it is bonded whereby the back of the welds is protected and any notch that may be present is strengthened. Similarly the gear case structure formed by the thin walls 20, 21, the wall 24, the plates 25 and the rigid foam filling 26 is also designed to have a strength in the necessary direction equivalent to that of a conventional gear case whilst using substantially less steel plate in the construction than hitherto.

Due to the foam filling 26 being bonded to the steel structures at a myriad of points, the high damping properties of the filling effectively prevent ringing of the structures; and the cavity in the gear wheel 10, being now filled with a continuous closed cellular material, is no longer a resonant cavity.

What I claim is:

1. A load-bearing hollow fabricated toothed gear comprising a hub, a toothed rim, and two axially-spaced annular relatively thin metal side plates connecting the hub to the rim, the annular space thus defined being filled with a body of rigid foamed plastics material bonded to the hollow gear's internal surfaces.

2. A load-bearing hollow fabricated toothed gear according to claim 1, wherein the plastics material is a rigid urethane foam.

3. A load-bearing hollow fabricated toothed gear according to claim 2, wherein the urethane foam is formed by mixing a polyether resin, a diisocyanato-diphenylmethane composition and trichlorofluoromethane.

4. A load-bearing hollow fabricated toothed gear according to claim 1, where said side plates are steel elements secured to said hub and rim by continuous annular weld regions.

References Cited

UNITED STATES PATENTS

| | | | |
|---|---|---|---|
| 1,427,721 | 8/1922 | Christenson | 74—443 |
| 1,638,118 | 8/1927 | Ford | 74—443 |
| 2,237,958 | 4/1941 | Hansen et al. | 74—606 |
| 3,346,174 | 10/1967 | Lieyens et al. | 230—233X |
| 3,385,127 | 5/1968 | Naruse et al. | 74—443 |

LEONARD H. GERIN, Primary Examiner

U.S. Cl. X.R.

74—574